United States Patent [19]

Tippmer

[11] 4,289,647

[45] Sep. 15, 1981

[54] METHOD OF PRODUCING PROCESS GASES CONTAINING HYDROGEN AND CARBON MONOXIDE FROM ASH OIL

[75] Inventor: Kurt Tippmer, Recklinghausen, Fed. Rep. of Germany

[73] Assignee: Firma Carl Still GmbH & Co. KG, Fed. Rep. of Germany

[21] Appl. No.: 161,312

[22] Filed: Jun. 20, 1980

Related U.S. Application Data

[63] Continuation of Ser. No. 52,618, Jun. 27, 1979, abandoned.

[51] Int. Cl.³ .............................................. C01B 2/06
[52] U.S. Cl. ..................................... 252/373; 48/215
[58] Field of Search ........................... 252/373; 48/215

[56] References Cited

U.S. PATENT DOCUMENTS

| | | | |
|---|---|---|---|
| 3,097,082 | 7/1963 | Guptill | 48/215 |
| 3,232,727 | 2/1966 | Guptill et al. | 48/215 |
| 3,232,728 | 2/1966 | Reynolds | 252/373 |
| 3,528,930 | 9/1970 | Schlinger et al. | 252/373 |
| 3,620,700 | 11/1971 | Schlinger et al. | 252/373 |
| 3,694,373 | 9/1972 | Schlinger et al. | 252/373 |

*Primary Examiner*—Howard T. Mars
*Attorney, Agent, or Firm*—McGlew and Tuttle

[57] ABSTRACT

A method of producing process gases containing hydrogen and carbon monoxide from ash oil comprises directing oil rich in ash and oxygen enriched gas into a burner which is fired downwardly into a pressure reactor so as to gasify the oil under pressure and under pressure of steam into gases which are partly burned and a remainder of gases. The remaining gases are separated from unburned carbon and ash and are quenched to convert them into steam by a wash water which entrains fine particles of carbon. The remaining heat content of the quench gases are used in another process. Wash water is directed into a decanter thickener in order to separate the wash water and entrain particles into clear water, carbon containing water and ash mud. The carbon containing water is used to produce steam for controlling the conversion of ash oil.

1 Claim, 1 Drawing Figure

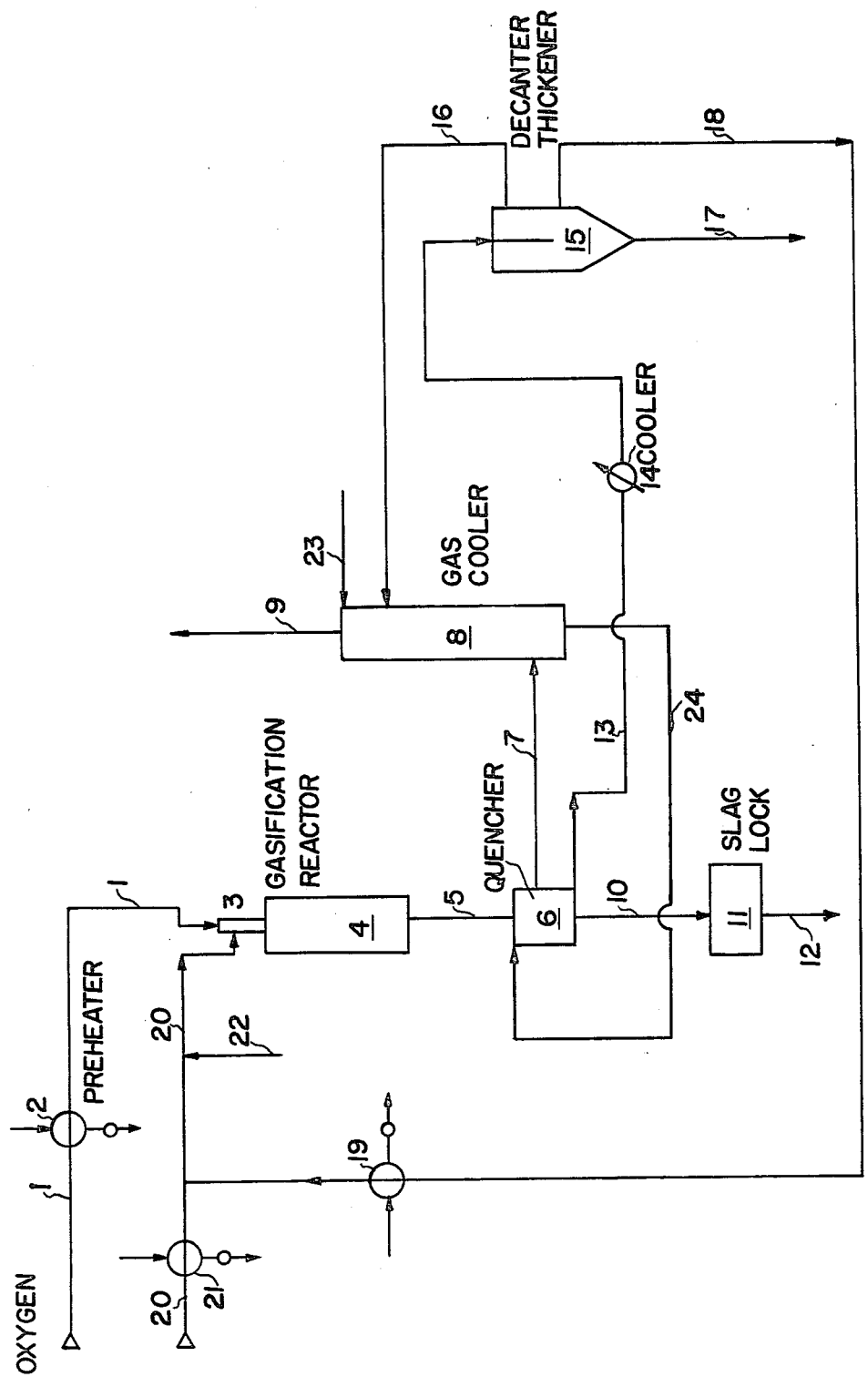

METHOD OF PRODUCING PROCESS GASES CONTAINING HYDROGEN AND CARBON MONOXIDE FROM ASH OIL

This is a streamline continuation of application Ser. No. 52,618 filed June 27, 1979, now abandoned.

FIELD AND BACKGROUND OF THE INVENTION

This invention relates in general to a method of producing gases containing hydrogen and carbon monoxide and in particular to a new and useful process for producing gases containing hydrogen and carbon monoxide from ash oil.

Such ash oils or residual oils rich in ash are obtained in crude oil refining processes. In the coal liquefaction also, an oily suspension of ash containing residual coal is obtained as residue. Both these residual oils are considered as ash oil for purposes of the present invention.

The method of producing process gases containing hydrogen and carbon monoxide from ash oils is similar to the coal gasification method. In the last named method, gas heat in excess is transferred for a large part to indirectly water-cooled, radiated heat absorbing surfaces of a radiant boiler. Ash particles are collected in the water and drained, while the pre-cooled process gas, still carrying ash particles and non-converted carbon, is further cooled, in a convective waste-heat boiler and with steam generation, to 250° to 300° C. and then purified in a scrubber and again cooled.

The reductive and catalytic processes in which the gases are to be used after scrubbing and maybe drying, require pressures of 20 to 60 bar. Accordingly, taking into account pressure losses, the ash oil is gasified in the pressure reactor at pressures of 25 to 80 bar. To control the reaction, steam is fed into the gasification flame. The operating temperatures are in the range between 1,300° and 1,500° C. This is wanted because at such high temperatures a high carbon conversion is obtained and, in addition, the ash particles become plastic and can agglomerate to an easily separable size.

In the prior art method of ash oil gasification, not inconsiderable amounts of non-converted carbon, particularly in the form of carbon black, are entrained by the gas and pass into the wash water. Recovering of this increased carbon proportion in the wash water is indispensible for the economy of the process. It is, therefore, washed out in a benzine scrubber, the carbon enriched benzine is mixed with a part of the ash oil to be introduced, the benzine is stripped off, and the ash oil enriched with fine carbon is fed into the process.

This manner of recovering non-converted carbon requires a considerably expensive equipment for the processing and circulating of the petroleum benzine. In addition, compensation for occurring benzine losses must be provided, so that the method is permanently charged with expenditures.

A method permitting to gasify the ash oil without the expensive benzine scrubbing of the crude process gas would, therefore, be advantageous.

SUMMARY OF THE INVENTION

The invention is directed to a carbon recovery process for the above-mentioned method, in which the expensive benzine scrubbing can be omitted.

In accordance with the invention, oil rich in ash and oxygen enriched gases are directed into a burner which is fired downwardly in a pressure reactor so as to gasify the oil under pressure and under presence of steam into gases which are partly burned and a remaining gas. The remaining gases are separated from unburnt carbon and ash and they are quenched to convert them into steam by a wash water which entrains fine particles of carbon. The remaining heat of the gases is used in another process. The wash water is directed into a decanter and a thickener in order to separate the wash water and entrained particles into clear water, carbon-containing water and ashmud. The carbon-containing water is used for producing steam to control the conversion of ash oil.

To this end it is provided that the wash water containing the carbon in fine particles is supplied to a decanter, which is at the same time designed as a thickener, where the wash water is separated into clear wash water, carbon containing water, and ash mud with the carbon containing water being used to produce steam to control the conversion of ash oil.

Surprisingly, it has been found that the thickener-decanter is capable of separating the wash water of the crude process gas into an upper layer of clear water, and a lower layer of carbon suspension containing 1 to 2% of carbon. At the bottom of the thickener-decanter, ash mud is deposited which can be removed from the process.

In this way and in accordance with the invention, the wash water benzine scrubber for the crude gas is saved.

It is possible to feed the carbon containing water after mixing with the ash oil directly and in liquid form into the gasification reactor.

Since in this case no longer steam but water is fed into the gasification, the heat consumption at the location is increased, in accordance with the necessary water vaporization, and to maintain the reaction, correspondingly more ash oil is burned.

This type of process is preferably used, when the economical conditions are given for it.

Alternatively, it is also possible to vaporize the carbon containing water after mixing it with the ash oil and to lead the mixture into the gasification reactor.

It has been proved to be of advantage to vaporize the carbon containing water after mixing with ash oil in an inverted-type evaporator. The mixture received thereby has the special characteristic of dispersing itself in the oxygen atmosphere of the gasification reactor.

Experience has shown that the carbon-containing wash water can be separated in a thickener-decanter in such a manner that no wash water in excess is obtained and the entire amount can be recycled into the gasification of the ash oil. Also, substances contained in the wash water and polluting the environment, such as HCN, hydrocarbons, etc., are eliminated in this way. Should a deficient amount of carbon suspension be obtained, external steam may be fed into the gasification in addition, of course.

Accordingly, it is an object of the invention to provide a method of producing process gases containing hydrogen and carbon monoxide which are used in the reduction of ores and the synthesis of hydrocarbon and oxygen-containing organic substances, comprising directing oil rich in ash and oxygen enriched gas into a burner and which is fired downward into a pressure reactor so as to gasify the oil under pressure and under the presence of steam into gases which are partly burned and a remainder of gases, separating the remainder of gases from the unburnt carbon and ash and quenching them to convert them into steam by a wash water which entrains fine particles of carbon, and using the remaining heat content of the quenched gases in another process, and directing the wash water to a decanter-thickener in order to separate the wash water and entrained particles into clear water, carbon containing water, and ash mud, and using the carbon containing water to produce steam for controlling the conversion of ash oil.

The various features of novelty which characterize the invention are particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

In the Drawing:

The only FIGURE of the drawing is a schematic representation of the process of producing containing hydrogen and carbon monoxide from ash oil in ash oil in accordance with the invention.

DESCRIPTION OF THE PREFERRED EMBODIMENT

Referring to the drawings in particular, the invention embodied therein comprises a process for producing process gases containing hydrogen and carbon monoxide from ash ore and which comprises directing oil rich and ash and oxygen rich gases into a burner and firing it downwardly into a pressure reactor so as to gasify the oil under pressure and under presence of steam into gases which are partly burned and a remainder of gases, separating the remainder of gases from the unburnt carbon and ash and quenching them to convert them into steam by directing them into contact with a wash water which entrains fine particles of carbon, using the remaining heat content of the quench gases in another process, directing the wash water into a decanter-thickener to separate the wash water and entrained particles into clear water, carbon containing water, and ashmud, and using the carbon containing water to produce steam for controlling the conversion of ash oil.

The method of producing process gases containing hydrogen and carbon monoxide from ash oil includes directing oxygen that is pure oxygen (99.5%) through a line 1 and a preheater 2 to burner 3 of a gasification reactor 4.

The ash oil is fed through a line 20 and a preheater 21 into burner 3 of reactor 4. The products of gasification flow through an outlet 5 into a quenching zone 6 wherefrom the gas is directed through a line 7 to a direct gas cooler 8, while in the lower part of the quenching zone 6, the ash in the form of larger clinker particles is removed from the process through a line 10, a slag lock 11, and a line 12.

The wash water containing the residual carbon and ash in fine particles is directed through a line 13 and a cooler 14 to a decanter 15 which, at the same time, is designed as a thickener. From the upper part of decanter 15, clear wash water is drained through a line 16 and recycled to the gas cooler 8. From the middle part of the decanter 15, carbon containing water, that is a carbon water suspension, is removed and recycled through a return line 18, a preheater 19, and a line 20 into burner 3 of gasification reactor 4, while the ash mud depositing in the sump of the decanter or thickener 15 is removed through a line 17. With a deficient amount of carbon water suspension, in proportion to the ash oil fed into the process from the outside through line 20, external steam may be supplied in addition into line 20, ahead of burner 3 of reactor 4, through a connection 22. The direct gas cooler 8 is supplied with clear wash water flowing through line 16 from decanter 15 and, in addition, through a connection 23, with a condensate, for example from the CO conversion or a fresh condensate. The entire amount of water from direct cooler 8 is returned through a line 24 to the quenching zone 6. The cooled gases are discharged through a line 9 to further purification or processing.

EXAMPLE

To liquefy 136 metric tons of pure coal by hydrogenation, 39,500 Nm$^3$ of hydrogen per hour are needed to obtain a steam ratio necessary for the following process, or to adjust the wash water separation. The hydrogen is obtained from a gas amount of carbon monoxide and hydrogen of 40,000 Nm$^3$ per hour which is produced in the inventive process. With ash oil obtained during the coal liquefaction, this gas amount may also be produced by means of pure oxygen (99.5 volume percent), under a pressure of 80 bar. The obtained ash oil amount per hour is 25,300 kgs, containing 7,100 kgs of ash and 18,200 kgs of carbon and oil. The ash oil is fed into the burner of the gasifying zone along with 12,260 kgs of carbon-containing water containing about 1.3% of carbon and recycled from the decanter. The oxygen content is 13,500 Nm$^3$ per hour. The gasifying reaction takes place at 1,430° C. In the quenching zone, a total of 7,100 kgs ash and 3,310 kgs of non-converted carbon is removed from the gas by means of warm circulated water. After cooling and saturation by adding about 67 metric tons per hour of preheated condensate in the direct gas cooler, gas with a high steam content is obtained having a steam to gas proportion of 1.8 Nm$^3$/Nm$^3$ and containing a total of 40,000 Nm$^3$ of carbon monoxide and hydrogen. A part of the contained solid matter, namely 3,600 kgs of ash with about 0.5% of carbon, is removed from the quenching zone directly through an ash lock, while the residual fine particles of carbon and ash pass with the wash water to the decanter. There, an amount of 3,500 kgs of ash mud with 3.7% of non-converted carbon is removed, while in the middle zone the so-called carbon black water containing about 1 to 2% of non-converted carbon is drained in an amount of 12,100 kgs and, after being preheated like the ash oil in a preheater to 288° C., recycled to the gasification.

While a specific embodiment of the invention has been shown and described in detail to illustrate the application of the principles of the invention, it will be understood that the invention may be embodied otherwise without departing from such principles.

What is claimed is:

1. A method of producing process gases containing hydrogen and carbon monoxide comprising:
    (a) mixing an amount by weight of ash oil with a smaller amount by weight of carbon-containing water;
    (b) adding steam to the mixture of step (a);
    (c) burning the mixture plus steam of step (b) with oxygen enriched gas, downwardly into a gasification reactor to gasify oil under pressure to produce partially burned gases with steam and residual carbon plus ash in fine particles;

(d) quenching the products of step (c) with quenching wash water from a direct gas cooler to form wash water with residual carbon plus ash, and ash in the form of clinker particles, and to separate the unburned gases;

(e) directing the unburned gases of step (d) to the direct gas cooler and cooling the unburned gases in the direct gas cooler with clean wash water to produce the process gases and the quenching wash water for step (d); and (f) decanting and thickening, in a decanter/thickener, the wash water with residual carbon plus ash from step (d) to form the clean wash water of step (e) at the top, the carbon-containing water of step (a) in the middle, and ash mud at the bottom, of the decanter/thickener.

* * * * *